United States Patent
Hwang et al.

(10) Patent No.: US 9,018,820 B2
(45) Date of Patent: Apr. 28, 2015

(54) STATOR STRUCTURE AND METHOD FOR MANUFACTURING

(75) Inventors: Jonq-Chin Hwang, Taipei (TW); Chun-Yu Hsiao, Longtan Township, Taoyuan County (TW); Sheng-Nian Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 203 days.

(21) Appl. No.: 13/357,362

(22) Filed: Jan. 24, 2012

(65) Prior Publication Data

US 2013/0049520 A1 Feb. 28, 2013

(30) Foreign Application Priority Data

Aug. 26, 2011 (TW) .............................. 100130726 A (51) Int. Cl.
*H02K 1/14* (2006.01)
*H02K 1/16* (2006.01)
*H02K 15/06* (2006.01)
*H02K 29/03* (2006.01)
*H02K 3/493* (2006.01)

(52) U.S. Cl.
CPC ......... *H02K 15/066* (2013.01); *Y10T 29/49009* (2015.01); *H02K 29/03* (2013.01); *H02K 1/148* (2013.01); *H02K 3/493* (2013.01)

(58) Field of Classification Search
None
See application file for complete search history.

(56) References Cited

U.S. PATENT DOCUMENTS

| | | | | |
|---|---|---|---|---|
| 2,736,829 A * | 2/1956 | Sills | ....................... | 310/216.098 |
| 5,422,530 A * | 6/1995 | Nolle | ............................. | 310/257 |
| 5,583,387 A * | 12/1996 | Takeuchi et al. | ....... | 310/216.009 |
| 5,786,651 A * | 7/1998 | Suzuki | ................... | 310/216.009 |
| 6,504,284 B1 * | 1/2003 | Kazama et al. | ......... | 310/216.016 |
| 6,584,813 B2 * | 7/2003 | Peachee et al. | ................ | 68/23.6 |
| 7,012,350 B2 * | 3/2006 | Peachee et al. | .............. | 310/166 |
| 2002/0149282 A1* | 10/2002 | Heidrich | ....................... | 310/218 |
| 2006/0071571 A1* | 4/2006 | Groening et al. | ............. | 310/214 |
| 2010/0072831 A1* | 3/2010 | Gadelmeier | ............... | 310/12.24 |
| 2010/0295405 A1* | 11/2010 | Shikata | ........................ | 310/195 |

FOREIGN PATENT DOCUMENTS

| | | |
|---|---|---|
| CN | 1758511 A | 4/2006 |
| CN | 101436794 A | 5/2009 |
| TW | 521470 B | 2/2003 |
| TW | M366826 U1 | 10/2009 |

\* cited by examiner

*Primary Examiner* — Tran Nguyen
(74) *Attorney, Agent, or Firm* — Muncy, Geissler, Olds & Lowe, P.C.

(57) ABSTRACT

The present invention relates to an integral or a non-integral stator structure for reducing the manufacturing complexity by eliminating the boot part of the tooth part thereof. The stator structure is made of a core material, and includes: a plurality of stator units, each having a tooth part and an annular part, in which different stator units can be connected with each other integrally or non-integrally, so as to form an annular stator structure. The tooth part of each stator unit is formed in a pillar shape that has a first end and a second end, and the first end is connected to the annular part.

9 Claims, 9 Drawing Sheets

STATOR STRUCTURE AND METHOD FOR MANUFACTURING

CROSS REFERENCE TO RELATED APPLICATION

This application claims the benefits of the Taiwan Patent Application Serial Number 100130726, filed on Aug. 26, 2011, the subject matter of which is incorporated herein by reference.

BACKGROUND OF THE INVENTION

1. Field of the Invention

The present invention relates to a stator structure and, more particularly, to a stator structure from which the boot part on a tooth part is eliminated so as to greatly reduce the complexity in manufacturing the stator structure.

2. Description of Related Art

With the development of technology, high-efficiency machines, such as various dynamos or electric motors, have become more and more popular. In addition, the importance of high-efficiency machines to humans is getting more and more recognition as the dependence on energy continuously increases.

As for electric motors, there are various kinds of electric motors. Focusing on the fundamental structure, an electric motor is mainly composed of a stator structure and a rotor structure. The rotor structure is primarily composed of magnets, and the material of the magnets is typically a permanent magnet. The material of the magnets can be such as neodymium magnet (NdFeB), ferric oxide, samarium cobalt (SmCo), or AlNiCo. The rotor structure rotates around a fixed center.

Figure 1:
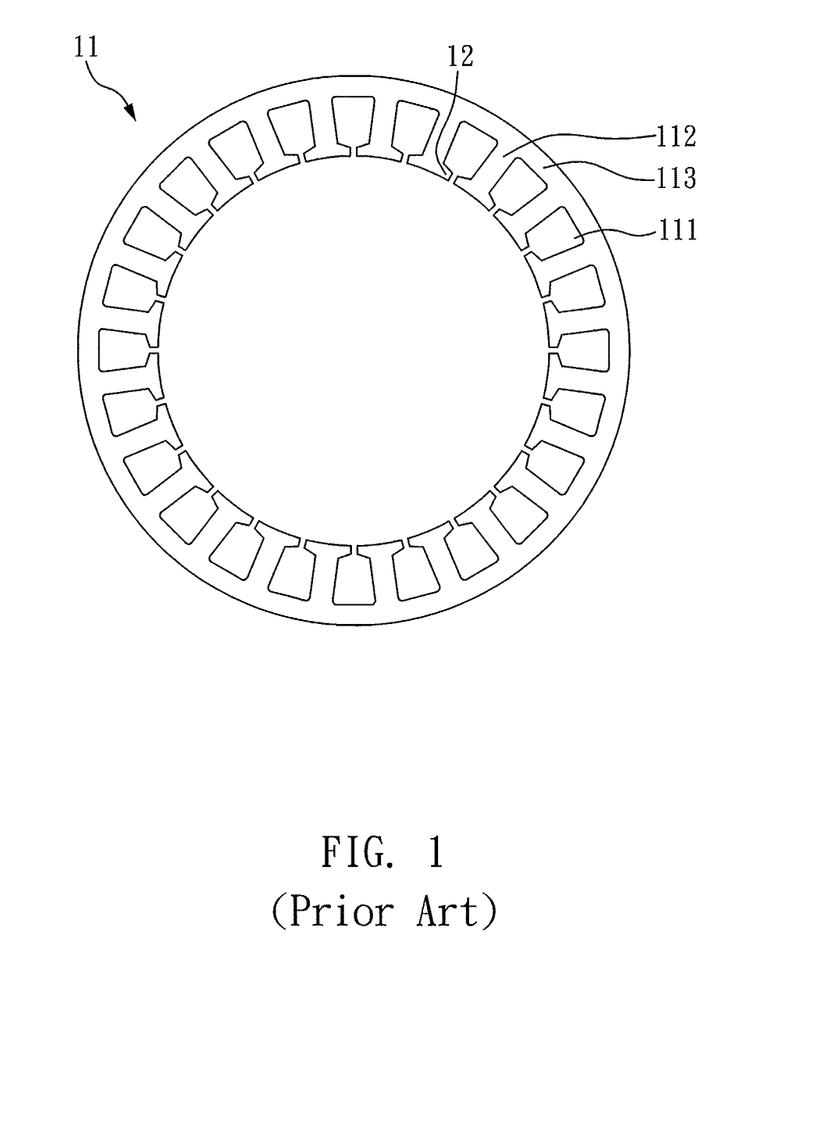
FIG. 1 is a schematic view illustrating the conventional stator structure.

With reference to FIG. 1, there is shown a typical stator structure. As shown in FIG. 1, a plurality of slots 111 are defined in the stator structure 11 and, a tooth part 112 is provided between every two adjacent slots 111 so as to form an annular structure. That is, a stator structure 11 with x slots 111 has x tooth parts. Additionally, the stator structure 11 can further comprise a stator silicon steel slice 113 disposed at the outer side of the slots 111.

Moreover, an insulation sheet or an insulation paper (not shown) is sleeved onto the tooth part 112 between two adjacent slots 111 and, after that, wires are wound onto the tooth part 112 between two adjacent slots 111 in a centralized winding manner. The conventional tooth part is generally provided with a structure of boot part 12, and such a structure of boot part 12 is capable of preventing the coils wound on the tooth part 112 and the insulation sheet or paper from falling and blocking the rotator, resulting in damage to the machine. Additionally, the structure of boot part 12 is further provided with the function of increasing the permeability of the entire system and the function of decreasing the induction electromotive force torque when the system starts to work.

However, the structure of boot part 12 is sophisticated in configuration, and this leads to a certain complexity when manufacturing, resulting in various difficulties of manufacturing and cutting (for example, an extra cutting process to form the boot part is required in manufacturing the stator structure), and greatly increasing the manufacturing complexity of the boot part. Besides, if any tiny defect occurs during the cutting process, such as uneven cutting to the stator unit, the whole stator unit has to be re-manufactured, which further increases, the manufacturing cost.

Therefore, it is desirable to provide an improved stator structure and manufacturing method to mitigate and/or obviate the aforementioned problems.

SUMMARY OF THE INVENTION

It is a first object of the present invention to provide a stator unit from which the boot part is eliminated, so as to greatly decrease the complexity in manufacturing the stator unit and, further, to reduce the cost of manufacturing.

It is a second object of the present invention to provide a stator structure which is an integral structure, and has no boot part, so as to greatly decrease the complexity in manufacturing the stator unit and, further, to reduce the cost of manufacturing.

It is a third object of the present invention to provide a stator structure which is a non-integral structure, and has no boot part, so as to decrease the complexity in manufacturing the stator unit and, further, to reduce the cost of manufacturing.

It is a fourth object of the present invention to provide a method for manufacturing a stator structure, in which the boot part of the tooth part is eliminated so as to decrease the complexity in manufacturing the stator structure and, further, to reduce the cost of manufacturing.

To achieve the objects, the stator unit of the present invention comprises: an annular part having a first connection end and a second connection end, the first connection end having a shape complementary to that of the second connection end; a tooth part formed in a pillar-shape and having a first end and a second end, the first end of the tooth part being located between the first connection end and the second connection end and being connected to the annular part; wherein the second end of the tooth part extends toward a direction which is approximately perpendicular to an alignment formed by connecting the first connection end to the second connection end.

In the aforementioned stator unit provided by the present invention, the tooth part is formed in a pillar-shape. The stator unit provided by the present invention is able to eliminate the conventional boot part on the tooth part, decrease the complexity of manufacturing the stator unit, and reduce the cost of manufacturing.

Moreover, in the stator unit of the present invention, the tooth part preferably comprises a recession part for allowing a spacer to be wedged therein. The spacer is provided for increasing the induction area between the stator unit of the present invention and a rotor magnet, so as to decrease the magnetic leakage, increase the magnetic permeability, and reduce the cogging torque. The aforementioned recession part is preferably formed by cutting with a cutting machine, or formed by grinding with a grindstone. The material of the spacer is preferably silicon still sheet, ferrous material, or a combination thereof.

In addition, in the stator unit of the present invention, an insulation unit is further provided for being sleeved onto the tooth part of the stator unit. Moreover, an adjacency to the second end of the tooth part is preferably provided with a cambered surface, and the cambered surface corresponds to the cambered surface of a rotor magnet, allowing the induction area between the cambered surface of the tooth part and the rotor magnet to be more uniform, so as to further decrease the magnetic leakage and increase the magnetic permeability.

A stator structure is provided in another embodiment of the present invention. The stator structure comprises: a plurality of above-mentioned stator units, wherein the plurality of the first connection ends and the plurality of the second connection ends of the annular parts of the stator units are connected with each other to form the annular stator structure, and wherein the second ends of the tooth parts of the plurality of stator units each are located in an inner side of the annular part and extend toward the center of the annular stator structure. Furthermore, the first connection ends and the second connection ends of the stator units are able to form the annular stator structure integrally. Accordingly, the stator structure of the present structure can be an integral stator structure, or a non-integral stator structure formed by the plurality of the stator units.

In the aforementioned stator structure provided by the present invention, the aforementioned tooth parts are formed in a pillar-shape. The stator structure provided by the present invention is able to eliminate the conventional boot part on the tooth part, decrease the complexity of manufacturing the stator unit and reduce the cost of manufacturing.

In addition, in the stator structure of the present invention, each tooth part comprises a recession part for allowing a spacer to be wedged therein. The spacer is provided for increasing the induction area between a stator unit of the present invention and a rotor magnet, so as to decrease the magnetic leakage, increase the magnetic permeability, and reduce the cogging torque. The aforementioned recession part is preferably formed by cutting with a cutting machine, or formed by grinding with a grindstone. The material of the spacer is preferably silicon still sheet, ferrous material, or a combination thereof.

In addition, in the stator structure of the present invention, an insulation unit is sleeved onto the tooth part of the stator unit.

Furthermore, the stator structure of the present invention is additionally suitable for use in a permanent magnet machine when the aforementioned spacer is wedged thereon. The permanent magnet machine is preferably a permanent magnet electric motor, or a permanent magnet generator. The shape of the spacer is preferably a reverse-U shape, allowing the spacer to be wedged into the recession part. In addition, the stator structure is preferably made of core material. The core material is preferably composed of silicon steel slice, or ferrous material. Furthermore, the stator structure of the present invention is suitable for a reluctance machine. Thus, the stator structure is highly flexible since it is also suitable for use in a permanent magnet machine when the aforementioned spacer is wedged thereon.

Moreover, an insulation sheet or an insulation paper is preferably sleeved on the tooth part of the stator structure. By this feature, the stator structure has the following advantages: a coil can be pre-wound onto the insulation sheet or an insulation paper externally so as to form a pre-wound winding assembly, and then the winding assembly is sleeved directly onto the tooth part of the stator structure (which implies the winding assembly is sleeved onto the pillar-shape tooth part directly).

In summary, according to the stator structure of the present invention, the boot part of the conventional stator structure can be eliminated, so as to simplify the process for manufacturing the stator structure. Moreover, according to the stator structure of the present invention, the stator structure is an open slot stator structure with. Using this open slot, a coil can first be wound externally and then sleeved onto the tooth part of the stator structure (which implies the winding assembly is sleeved onto the pillar-shape tooth part directly). Accordingly, there is no need to use a winding machine for winding, and the high expense of buying a winding machine is thereby eliminated, thereby reducing the cost of manufacturing a stator structure.

In addition, in the stator structure of the present invention, the annular part preferably has at least one opening for allowing the insulation sheet to be fixed firmly onto the stator structure. Therefore, in manufacturing the insulation sheet or the insulation paper, a protrusion can be formed thereon. The protrusion can be connected with the aforementioned openings and locked on with a screw, allowing the insulation sheet or the insulation paper to be fixed firmly onto the stator structure. The aforementioned openings are preferably formed by line cutting method, or by drilling with a drilling machine, or by milling with a milling machine.

In order to achieve excellent permeability, the aforementioned spacer may be installed onto the stator structure, so as to increase the permeability and the induced electromotive force, improve the cogging torque, increase the efficiency of the machine, and prevent the winding assembly sleeved onto the stator structure from blocking the rotor structure due to loosening.

Furthermore, the aforementioned stator structure with open slot can be used as the stator structure of a reluctance machine. Therefore, a reluctance machine can be manufactured by simply re-manufacturing the rotor structure. In other words, the stator structure of the present invention can be used not only in a reluctance machine, but also in a permanent magnet machine when the spacer is wedged thereon. Accordingly, the processing efficiency is significantly increased and the cost for mold opening can be eliminated.

To achieve the objects, the method for manufacturing a stator structure of the present invention comprises: providing a plurality of the abovementioned stator units; connecting the first end of one of the stator units with the second end of another stator unit together to form a stator unit assembly; and repeating the previous step to continuously integrate a stator unit to the stator unit assembly until the annular stator structure is formed by the stator unit assembly.

The method for manufacturing a stator structure of the present invention further comprises a step for forming a recession part on each of the second end of the tooth part. The recession part allows a spacer to be wedged therein for increasing the induction area between a stator unit and a rotor magnet, so as to decrease the magnetic leakage, increase the magnetic permeability, and reduce the cogging torque.

In addition, the stator structure manufactured by the method of the present invention is suitable for a permanent magnet machine when the aforementioned spacer is accompanied therewith. Moreover, the shape of the spacer is preferably a reverse-U shape, allowing the spacer to be wedged into the recession part. Furthermore, the core material is preferably composed of silicon steel slice, or ferrous material.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Embodiment 1

Stator Unit

Figure 2:
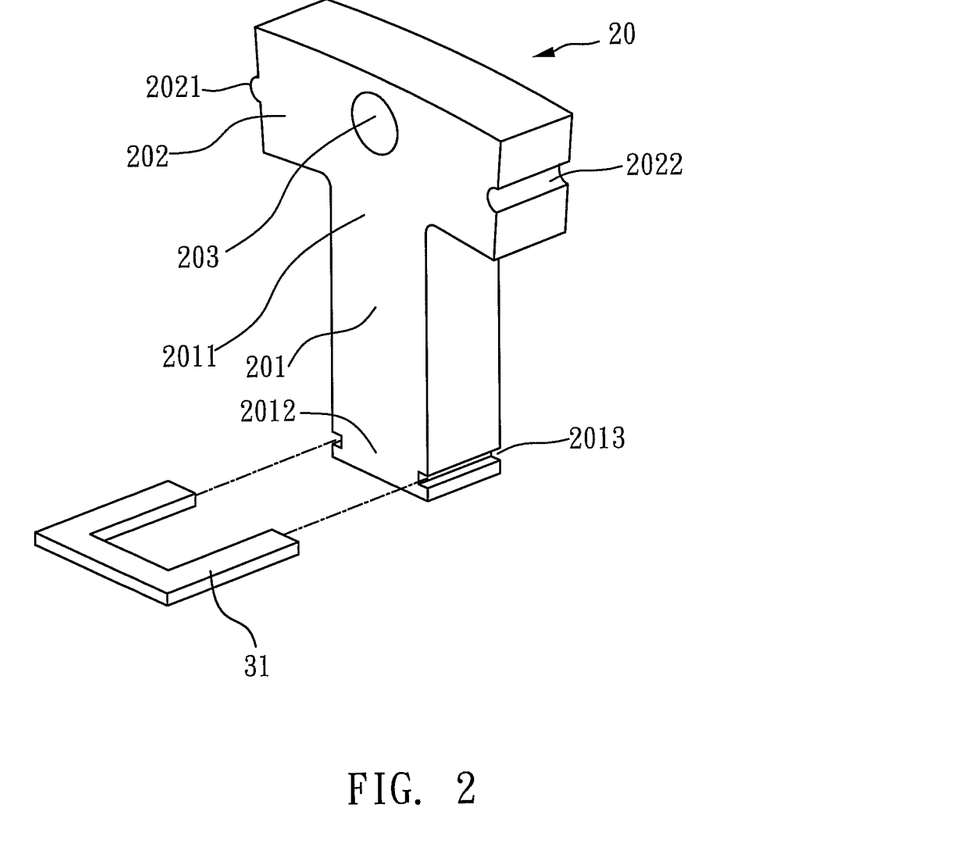
FIG. 2 is a schematic view illustrating the stator unit in accordance with the first embodiment of the present invention.

With reference to FIG. 2, FIG. 2 is a schematic view illustrating the stator unit in accordance with the first embodiment of the present invention. As shown in FIG. 2, the stator unit 20 comprises: a tooth part 201 and an annular part 202. The annular part 202 has a first connection end 2021 and a second connection end 2022. The first connection end 2021 has a shape complementary to that of the second connection end 2022. The tooth part 201 is formed in a pillar-shape and has a first end 2011 and a second end 2012. The first end 2011 of the tooth part 201 is located between the first connection end 2021 and the second connection end 2022 and is connected to the annular part 202. The tooth part 201 and the annular part 202 are made of ferrous material. Besides, the second end 2012 of the tooth part 201 extends toward a direction which is approximately perpendicular to an alignment formed by connecting the first connection end 2021 with the second connection end 2022, as illustrated in FIG. 2.

In this embodiment, the boot part on the tooth part 201 is eliminated in the stator unit 20 lessening the complexity in manufacturing the stator unit 20, and further reducing manufacturing costs. Furthermore, in the stator unit 20 in accordance with the first embodiment of the present invention, the tooth part 201 preferably includes at least one recession part 2013. The aforementioned recession part 2013 is preferably formed by removing the ferrous material through cutting with a cutting machine or by grinding with a grindstone.

Figure 3:
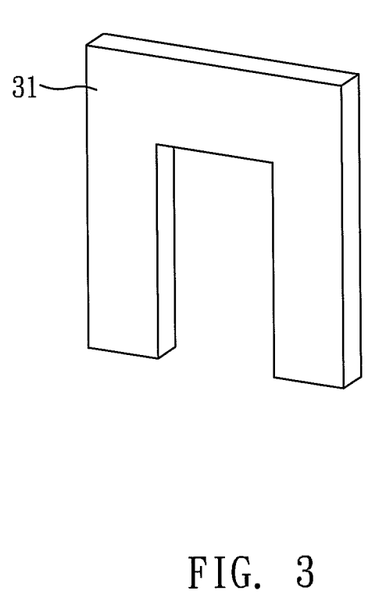
FIG. 3 is a schematic view illustrating the spacer used with the stator unit in accordance with the first embodiment of the present invention.

It is noted that, with reference to FIG. 3 as well, the aforementioned recession part 2013 allows a spacer 31 to be wedged thereon. FIG. 3 is a schematic view illustrating the spacer for use with the stator unit in accordance with the first embodiment of the present invention. As shown in FIG. 3, the spacer 31 has a reverse-U shape, and the material of the spacer 31 is silicon steel slice. Besides, the reverse-U shape spacer 31 is wedged into the recession part 2013 as shown in FIG. 2. The spacer 31 is wedged into the recession part 2013 tightly for increasing the induction area between the stator unit 20 and a rotor magnet, so as to increase the magnetic permeability and reduce the cogging torque.

Besides, in the stator unit in accordance with the first embodiment of the present invention, the tooth part 201 may have a cambered surface (not shown). The cambered surface is located in the adjacency to the second end 2012 of the tooth part 201, and the cambered surface corresponds to a cambered surface of a rotor magnet, allowing the induction area between the cambered surface of the tooth part and the rotor magnet to be more uniform, so as to further decrease the magnetic leakage and increase the magnetic permeability.

Moreover, as mentioned above, the annular part 202 has a first connection end 2021 and a second connection end 2022, and the first connection 2021 end has a shape complementary to that of the second connection end 2022, so as to allow a tight connection when the stator units are connected with each other. However, the tight connection of the stator units 20 can be achieved by using glue or soldering, but not be limited to the aforementioned complementary shapes or procedures.

In addition, the annular part 202 may further include an opening 203. The opening 203 can be formed by line cutting, drilling through a drilling machine, or milling through a milling machine.

Embodiment 2

Non-Integral Stator Structure

Figure 4:
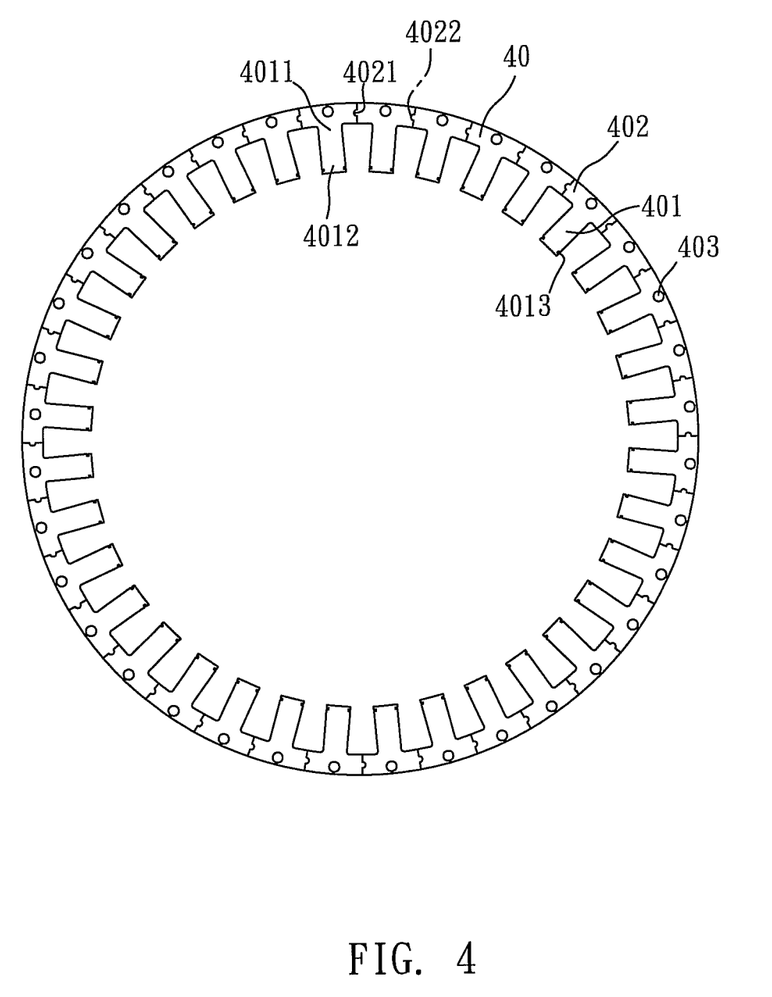
FIG. 4 is a schematic view illustrating the stator unit in accordance with the second embodiment of the present invention.

With reference to FIG. 4, FIG. 4 is a schematic view illustrating the stator unit in accordance with the second embodiment of the present invention. As shown in FIG. 4, the stator structure comprises: a plurality of stator units 40 (such as the stator unit described in the first embodiment), each stator unit 40 having a tooth part 401 and an annular part 402 respectively. The annular part 402 has a first connection end 4021 and a second connection end 4022, and the first connection end 4021 has a shape complementary to that of the second connection end 4022, allowing each of the stator units 40 to be able to connect with each other tightly, so as to form the annular stator structure in accordance with the second embodiment of the present invention. It can be seen from FIG. 4 that the stator structure in accordance with the second embodiment of the present invention is an annular stator structure composed of 36 stator units 40. However, it is to be noted that the number of the stator units 40 is not limited to 36; the 36 stator units 40 illustrated in FIG. 4 are provided for illustrative purposes only. Furthermore, the tooth parts 401 are formed in a pillar-shape, and each tooth part 401 has a first end 4011 and a second end 4012 respectively. The first end 4011 is connected with the annular part 402.

Besides, as shown in FIG. 4, the second end 4012 of each tooth part 401 is located in an inner side of the annular part 402 and extends toward a center of the annular stator structure. Meanwhile, two recession parts 4013 are formed by cutting via a cutting machine as well in the stator structure in accordance with the second embodiment of the present invention. The recession parts 4013 are formed on the right and the left sides of the tooth part 401 in looking down at the stator structure of the present invention. With reference to both FIG. 2 and FIG. 3, the recession part 4013 allows the reverse-U shaped spacer 31 as described in the first embodiment to be wedged into the recession part 4013, for increasing the induction area as describe above, so as to increase the magnetic permeability and reduce the cogging torque. It is to be noted that the stator structure in accordance with the second embodiment of the present invention is suitable for use in a permanent magnet machine when the abovementioned spacer is wedged thereon. The permanent magnet machine can be a permanent magnet motor, or a permanent magnet generator. Moreover, the disposition of the spacer also can prevent a winding assembly sleeved on the stator structure from loosening to jam the rotor structure.

Figure 5:
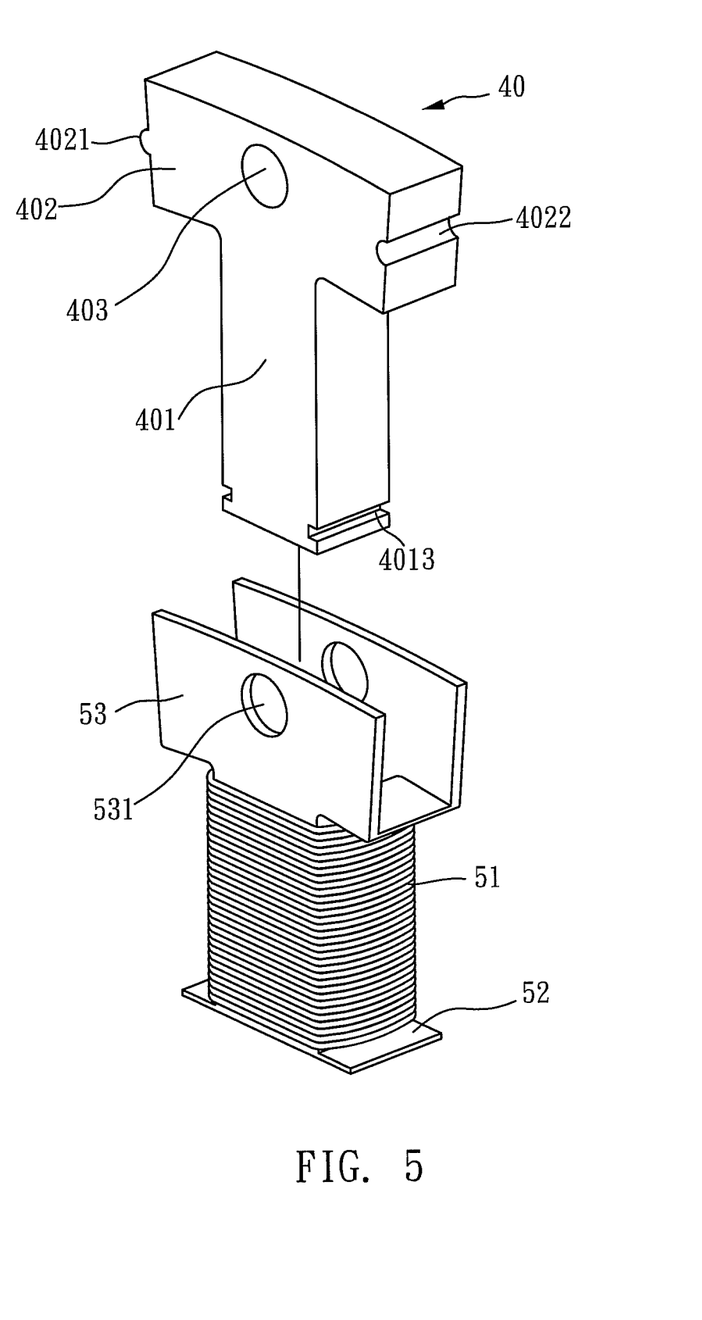
FIG. 5 is a schematic view illustrating the stator unit of the stator structure in accordance with the second embodiment of the present invention, and the insulation sheet used therewith.

With reference to FIG. 5, FIG. 5 is a schematic view illustrating the stator unit of the stator structure in accordance with the second embodiment of the present invention in accompaniment with an insulation sheet. From FIG. 5, it can be seen that the tooth part 401 of the stator unit 40 is formed in a pillar shape, which implies the boot part of the conventional tooth part is no longer required. In addition, an opening 403 is defined in the annular part 402 of the stator unit 40.

As shown in FIG. 5, with this structure, a coil 51 can be first wound on an insulation sheet 52 to form a winding assembly, and then the winding assembly is sleeved onto the stator unit 40 directly. Besides, a protrusion 53 is further formed on the insulation sheet 52, and the protrusion 53 further has an aperture 531. Therefore, the opening 531 can be aligned with the abovementioned opening 403 for being locked together with a screw, thereby fixing the insulation sheet 52 firmly to the stator unit 40.

It is worth emphasizing that, the aforementioned arrangement of winding on the insulation sheet first and then sleeving the insulation sheet onto a stator structure can also be implemented in the first embodiment of the present invention. Accordingly, the first embodiment of the present invention also does not need to use a winding machine for winding, so as to save the high expense of buying a winding machine, thereby greatly reducing the cost of manufacturing a stator structure.

Embodiment 3

Integral Stator Structure

Figure 6:
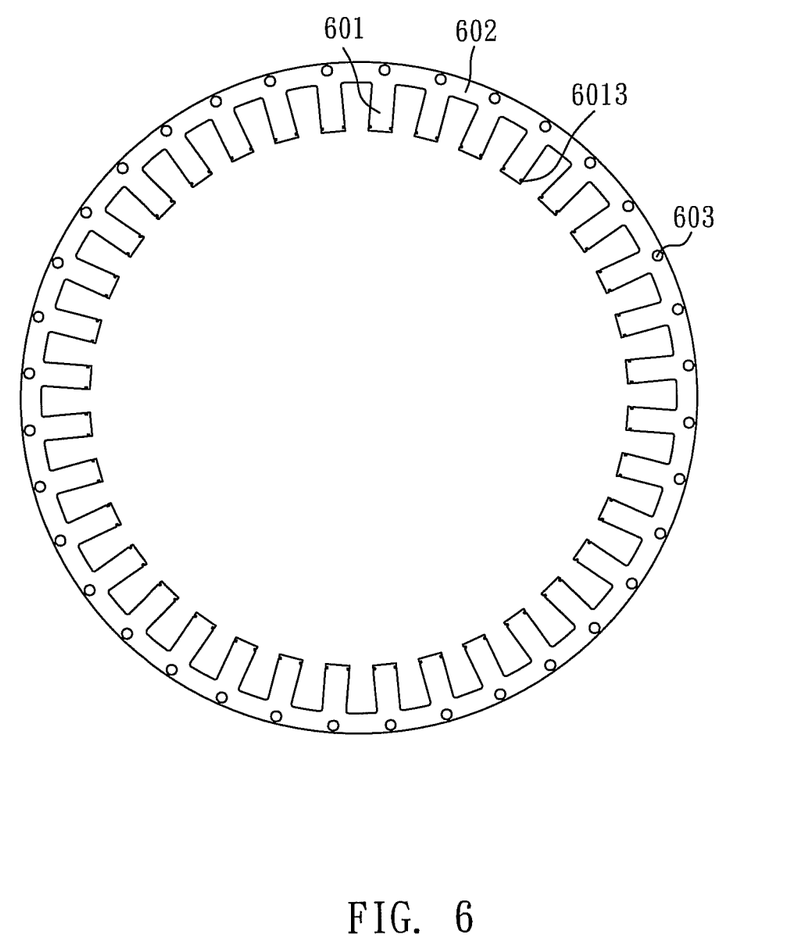
FIG. 6 is a schematic view illustrating the stator structure in accordance with the third embodiment of the present invention.

The stator structure in accordance with the third embodiment of the present invention is similar to that of the second embodiment, except that the stator structure of the third embodiment is an integral stator structure.

With reference to FIG. 6, FIG. 6 is a schematic view illustrating the stator structure in accordance with the third embodiment of the present invention. As shown in FIG. 6, the basic configuration of the stator structure of the third embodiment is the same as that of the second embodiment. The only difference between the two embodiments is that the stator structure of the second embodiment is formed by connecting the first connection end and the second connection end of the stator unit so as to form an annular stator structure and, in the stator structure of the third embodiment, the annular stator structure is formed integrally by the stator units.

Since the tooth part of the stator structure in accordance with the third embodiment of the present invention is not provided with any boot part, it implies that the conventional boot part is also eliminated, and thus the complexity for manufacturing the stator structure can be reduced. Furthermore, similar to the second embodiment, the stator structure of the third embodiment can have two recession parts 6013 for allowing a spacer to be wedged therein.

Moreover, the stator unit as described in the first embodiment of the present invention, and the stator structure as described in the second and the third embodiments are all made of ferrous material. It is further noted that the material of the spacer can be chosen from higher-grade material in comparison with the ferrous material so as to increase the permeability and the induced electromotive force.

In addition, similar to the stator structure of the second embodiment, an insulation sheet can be sleeved onto the tooth part 601 of the stator structure in accordance with the third embodiment of the present invention, which permits a coil to be wound on the insulation sheet first (for forming a winding assembly) and then sleeves the winding assembly onto the tooth part 601 (i.e., directly onto the pillar-shape tooth part). The material of the insulation sheet can be nylon, or the like, which is relatively rigid, so as to prevent the insulation sheet from fracture when proceeding winding.

Similarly, a protrusion can be further manufactured on the insulation sheet, and at least one opening 603 is defined in the protrusion and the annular part 602 by using a drilling machine. Therefore, the openings on both the protrusion and the annular part can be locked together by a screw, allowing the insulation sheet to be fixed firmly on the stator structure.

It is to be noted that the number of the tooth parts in FIG. 6 is not limited to 36; the 36 tooth parts illustrated in FIG. 6 are provided for illustrative purpose only. The stator structure of the third embodiment can have any number of tooth parts.

What should be emphasized is that the difference between stator structures of the second and the third embodiments is that the stator structure of the third embodiment is an integral stator structure, which is formed as illustrated in FIG. 6 directly from ferrous material, while the stator structure of the second embodiment is a non-integral stator structure, which is formed by connecting a plurality of stator units 40 as illustrated in FIG. 5 (or the stator units 20 as illustrated in FIG. 2). Only the difference portion between the two embodiments is depicted herein since the implementation and the efficiency of the third embodiment of the present invention are the same as those of the second embodiment, and thus a detailed description is deemed unnecessary.

Embodiment 4

Winding Method of Stator Unit

Figure 7:
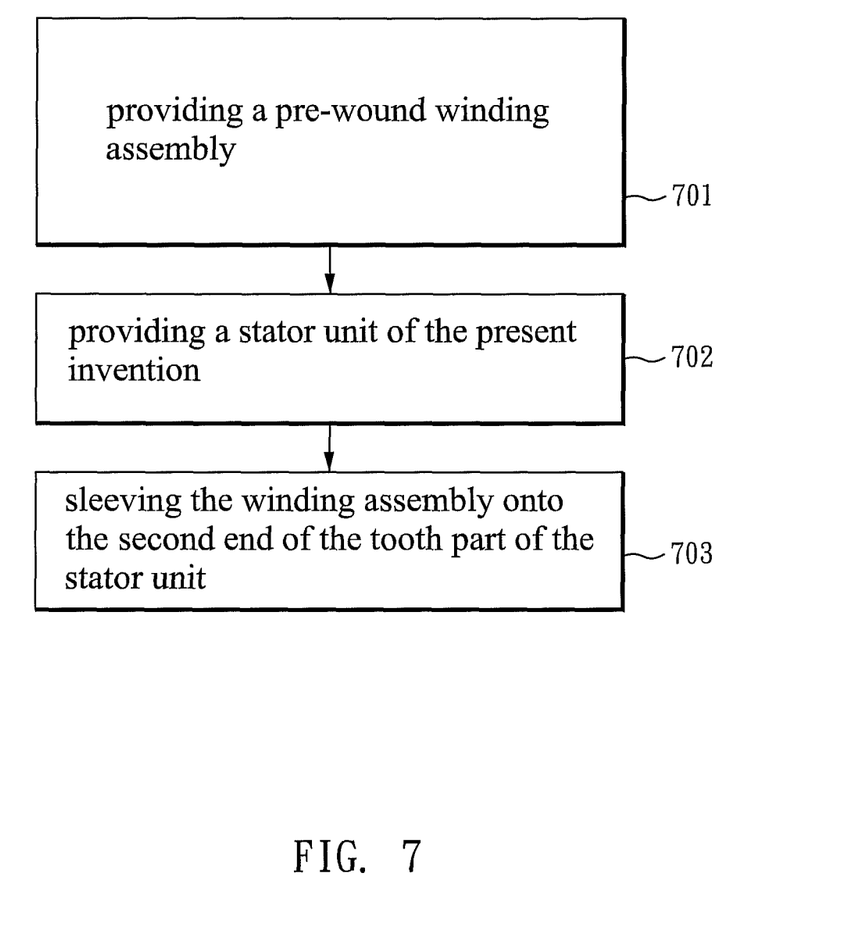
FIG. 7 is a flowchart illustrating the winding method in accordance with the fourth embodiment of the present invention.

The fourth embodiment of the present invention is to provide a winding method for the stator unit of the present invention. With reference to FIG. 7, FIG. 7 is a flowchart illustrating the winding method in accordance with the fourth embodiment of the present invention. As shown in FIG. 7, the winding method for a stator unit comprises: providing a prewound winding assembly (step 701); providing a stator unit of the present invention (step 702); and sleeving the winding assembly onto the second end of the tooth part of the stator unit (step 703).

In addition, in step 702, the stator unit can be the same as the stator unit 20 described in the first embodiment of the present invention. Moreover, the implementation of the stator unit of the fourth embodiment can be accomplished with reference to those of the first, the second, and the third embodiments, thus a detailed description is deemed unnecessary.

Embodiment 5

Method for manufacturing Integral Stator Structure

Figure 8:
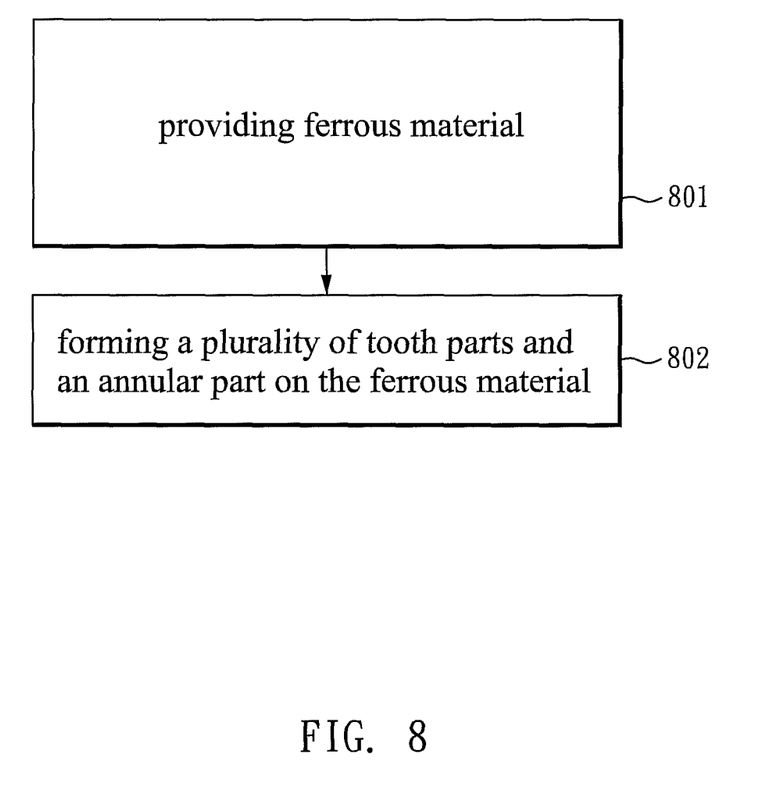
FIG. 8 is a flowchart illustrating the manufacturing method of the integral stator structure of the present invention.

As for the method for manufacturing a stator structure, please refer to FIG. 8, which is a flowchart illustrating the manufacturing method of the integral stator structure in accordance with the fifth embodiment of the present invention. As shown in FIG. 8, the method for manufacturing a stator structure comprises: providing ferrous material (step 801); and forming a plurality of tooth parts and an annular part on the ferrous material (step 802). In the method, the tooth parts are protruded out from the annular part, and each tooth part is formed in a pillar-shape and has a first end and a second end, wherein the first end is connected with the annular part, and the second end extends toward a center of the annular part and departs away from the annular part.

To be more specific, the method for manufacturing a stator structure in accordance with the fifth embodiment of the present invention is provided to form the stator structure integrally. That is, after providing the ferrous material, a plurality of tooth parts are integrally formed in pillar-shape by cutting, without having any boot part. Therefore, the complexity for manufacturing the stator structure can be reduced. Moreover, the method for manufacturing the stator structure in accordance with the fifth embodiment of the present invention may further comprise a step of forming a plurality of recession parts on the second end of each tooth part by a cutting machine. The recession part allows a spacer made of silicon steel slice to be wedged therein.

Moreover, in the method for manufacturing the stator structure in accordance with the fifth embodiment of the present invention, a coil can be wound on a insulation sheet first (for forming a winding assembly), and the winding assembly is sleeved onto the tooth part of the stator structure. Accordingly, the winding procedure can be achieved without using a winding machine, thereby eliminating the high expense of buying the winding machine, so as to greatly decrease the manufacturing cost of a stator structure. Furthermore, the method for manufacturing the stator structure in accordance with the fifth embodiment of the present invention may further comprise a step of sleeving a pre-wound winding assembly onto the tooth part directly from the second end thereof.

Embodiment 6

Method for Manufacturing Non-Integral Stator Structure

Figure 9:
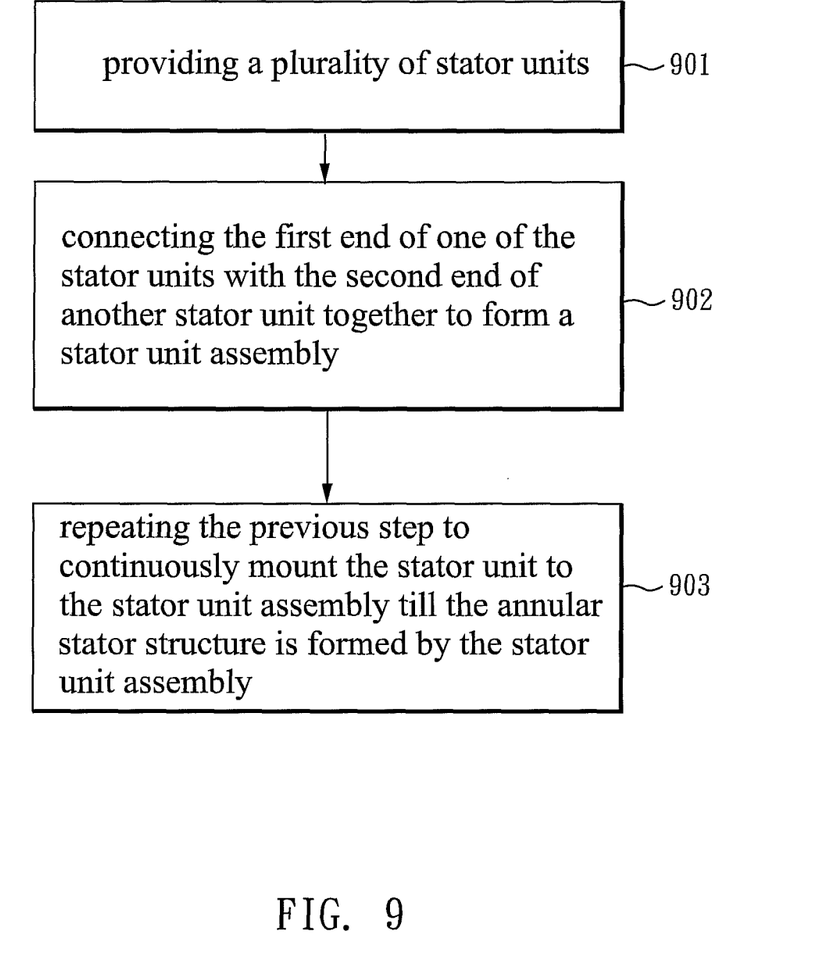
FIG. 9 is a flowchart illustrating the manufacturing method of the non-integral stator structure of the present invention.

With reference to FIG. 9, FIG. 9 is a flowchart illustrating the manufacturing method of the non-integral stator structure in accordance with the sixth embodiment of the present invention. As shown in FIG. 9, the method for manufacturing a stator structure comprises: providing a plurality of stator units (step 901); connecting the first end of one of the stator units with the second end of another stator unit together to form a stator unit assembly (step 902); and repeating the previous step to continuously mount the stator unit to the stator unit assembly until the annular stator structure is formed by the stator unit assembly (step 903).

In step 901, the stator unit can be the same as the stator unit 20 described in the first embodiment of the present invention. Besides, the implementation of the sixth embodiment is the same as that of the fifth embodiment, except that the implementation of the sixth embodiment is provided to connect the plurality of stator units 20 to form an non-integral annular stator structure, while the implementation of the fifth embodiment is provided to form an integral annular stator structure directly from the ferrous material.

Although the present invention has been explained in relation to its preferred embodiment, it is to be understood that many other possible modifications and variations can be made without departing from the spirit and scope of the invention as hereinafter claimed.

What is claimed is:

1. A stator unit, comprising:
   an annular part having a first connection end and a second connection end, the first connection end having a shape complementary to that of the second connection end; and
   a tooth part formed in a pillar-shape without a boot part and having a first end and a second end, the first end of the tooth part being located between the first connection end and the second connection end and being connected to the annular part;
   wherein the second end of the tooth part extends toward a direction that is approximately perpendicular to an alignment formed by connecting the first connection end to the second connection end; and
   wherein the second end of the tooth part further comprises two recession parts, and the two recession parts are respectively formed on two outsides of the tooth part, each of the two recession parts is a strip shape; and
   wherein the second end of the tooth part is provided with a spacer having a U-shape, and the spacer is wedged into the two recession parts;
   wherein a length of the tooth part without the spacer is the same as a length of tooth part with the spacer.

2. The stator unit as claimed in claim 1, wherein the stator unit further comprises an insulation unit wrapped thereon.

3. The stator unit as claimed in claim 2, wherein the second end of the tooth part further comprises a recession part.

4. The stator unit as claimed in claim 3, wherein the second end of the tooth part is provided with a spacer, and the spacer is wedged into the recession part.

5. A stator structure, comprising:
   a plurality of stator units, each comprising
   an annular part having a first connection end and a second connection end, the first connection end having a shape complementary to that of the second connection end; and
   a tooth part formed in a pillar-shape without a boot part and having a first end and a second end, the first end of the tooth part being located between the first connection end and the second connection end and being connected to the annular part;
   wherein the second end of the tooth part extends toward a direction that is approximately perpendicular to an alignment formed by connecting the first connection end to the second connection end; and
   wherein the first connection ends and the second connection ends of the annular parts of the plurality of stator units are connected with each other to form an annular stator structure;
   wherein the second end of the tooth part further comprises two recession parts, and the two recession parts are respectively formed on two outsides of the tooth part, each of the two recession parts is a strip shape; and
   wherein the second end of the tooth part is provided with a spacer having a U-shape, and the spacer is wedged into the two recession parts;
   wherein a length of the tooth part without the spacer is the same as a length of the tooth part with the spacer.

6. The stator structure as claimed in claim 5, wherein the stator unit further comprises an insulation unit wrapped thereon.

7. The stator structure as claimed in claim 6, wherein the second end of the tooth part further comprises a recession part.

8. The stator structure as claimed in claim 7, wherein the second end of the tooth part is provided with a spacer, and the spacer is wedged into the recession part.

9. The stator structure as claimed in claim 5, wherein the first connection end and the second connection end of the stator units are connected with each other integrally by connecting the first and second connection ends thereof to form the stator structure.

* * * * *